United States Patent
English

(10) Patent No.: US 8,838,570 B1
(45) Date of Patent: Sep. 16, 2014

(54) DETECTION OF BOT-INFECTED COMPUTERS USING A WEB BROWSER

(75) Inventor: Edward D. English, Scituate, MA (US)

(73) Assignee: Trend Micro Incorporated, Tokyo (JP)

( * ) Notice: Subject to any disclaimer, the term of this patent is extended or adjusted under 35 U.S.C. 154(b) by 1675 days.

(21) Appl. No.: 11/594,043

(22) Filed: Nov. 6, 2006

(51) Int. Cl.
*G06F 17/30* (2006.01)

(52) U.S. Cl.
USPC ........................................ 707/709; 707/710

(58) Field of Classification Search
CPC .................... G06F 17/30899; G06F 17/30861; G06F 2221/2119
USPC .................................. 709/218, 202; 707/1, 9
See application file for complete search history.

(56) References Cited

U.S. PATENT DOCUMENTS

| | | | |
|---|---|---|---|
| 6,721,721 B1 * | 4/2004 | Bates et al. ............................. | 1/1 |
| 6,842,773 B1 * | 1/2005 | Ralston et al. ................. | 709/206 |
| 6,925,465 B2 * | 8/2005 | Lamberton et al. .................... | 1/1 |
| 7,454,779 B2 * | 11/2008 | Hughes et al. ...................... | 726/2 |
| 2001/0020242 A1 * | 9/2001 | Gupta et al. ............... | 707/501.1 |
| 2003/0061309 A1 * | 3/2003 | Brown et al. ................. | 709/218 |

OTHER PUBLICATIONS

Trend Micro HouseCall, 2 sheets, 1989-2005 Trend Micro Incorporation, webpage [online] [retrieved on Sep. 15, 2006]. Retrieved from the internet: http://www.trendmicro.com/hc_intro/default.asp.
Network Reputation Services, 2 sheets, 1989-2006 Trend Micro Incorporated, webpage [online] [retrieved on Sep. 19, 2006]. Retrieved from the internet: http://www.trendmicro.com/en/products/nrs/overview.htm.
Trend Micro Takes Unprecedented Approach to Eliminating Botnet Threats with the Unveiling of InterCloud Security Service, 3 sheets, 2006 Press Releases, Trend Micro Incorporated, webpage [online] [retrieved on Sep. 29, 2006]. Retrieved from the Internet: http://www.trendmicro.com/en/about/news/pr/archive/2006/pr092506.htm.
Killing Spam Harvesting Bots, 3 sheets, Jul. 2005, [retrieved on Sep. 15, 2006]. Retrieved from the internet: http://www.andrewsw.com/news/?p=968.
Website Publisher Forums, How do I write and retrieve strings from a text file using PHP?, 7 sheets, Powered by vBulletin, 2000-2006 Jelsoft Enterprises Limited, [retrieved on Sep. 15, 2006]. Retrieved from the internet: http://www.websitepublisher.net/forums/showthread.php?t=5793.
What is a GUID?—A Word Definition From the Webopedia Computer Dictionary, 4 sheets, Jun. 20, 2002, [retrieved on Sep. 11, 2006]. Retrieved from the internet: http://www.webopedia.com/TERM/G/GUID.html.

(Continued)

*Primary Examiner* — Melanie Jagannathan
*Assistant Examiner* — Jason Harley
(74) *Attorney, Agent, or Firm* — Okamoto & Benedicto LLP

(57) ABSTRACT

In one embodiment, a web browser running in a client computer is configured to connect to an external server computer upon invocation of a home page or other configurable uniform resource locator. The server computer may receive the IP address of the client computer and check the IP address of the client computer against a listing of IP addresses of known bot-infected computers. The web browser may pass the URL address of the home page as a URL parameter. The server computer may redirect the web browser to the home page or other location when the client computer is not infected by a bot or, when the client computer is bot-infected, to a solutions web page that provides access to a malicious code scanner that may be utilized to remove the bot.

12 Claims, 4 Drawing Sheets

(56) References Cited

OTHER PUBLICATIONS

Botnet from Wikipedia, the free encyclopedia, 4 sheets, Sep. 2006, [retrieved on Sep. 15, 2006]. Retrieved from the internet: http://en.wikipedia.org/wiki/Botnet.

Drew Cullen, "Trend Micro to kick butt on botnets", Sep. 26, 2006, 4 sheets, The Register, webpage [online] [retrieved on Sep. 29, 2006]. Retrieved from the internet: http://www.theregister.com/2006/09/26/trend_micro_botnet_appliance/print.html.

* cited by examiner

DETECTION OF BOT-INFECTED COMPUTERS USING A WEB BROWSER

BACKGROUND OF THE INVENTION

1. Field of the Invention

The present invention relates generally to detection of malicious code, and more particularly but not exclusively to detection of bots.

2. Description of the Background Art

"Bots" are stealthy, remotely-controllable unauthorized software programs running quietly in user computers. A bot can receive and execute instructions from a remote server computer operated by the bot's originator, which is also referred to as a "hacker" or "bot herder." A network of bots is called a "botnet." A bot may be configured to use the infected computer to send spam or junk e-mail, participate in denial of service attacks to bring down servers, host pornography, and perform click-fraud, all without the computer owner's authorization. In the network security industry, databases are kept and frequently updated with lists of new and known IP addresses of computers infected with bot programs. Computers can be infected by bots via several different methods including drive-by-web-downloads and spyware downloaders that install other software onto a computer. Most users don't even know their computers are bot-infected and being used for malicious or unauthorized purposes.

Commercially available malicious code scanners (e.g., anti-virus or anti-spyware software) may be used to detect and remove bots and other malicious codes. However, this solution requires installation of compatible software onto the computer to be protected. Such software typically runs in computer memory constantly, consuming certain amounts of CPU power and memory resources to monitor the computer for infections. It is also necessary to install and run operating system compatible versions of the software. Accordingly, some users don't bother checking their computers for bots.

SUMMARY

In one embodiment, a test to determine if a client computer is a known bot is performed when the client computer's web browser is activated to invoke a configurable uniform resource locator (URL). The configurable URL may be, for example, that of the web browser's home page. Other web browser configurable URLs may also be used to trigger the bot testing including URLs associated with clicking search buttons or those translated or transformed using a host file. As a particular example, invocation of a home page URL may occur when the web browser is started up or when its home page button or menu selection is activated. By adding some additional characters to the browser's default home page URL, a bot detection server computer can receive the IP address of the client computer and compare the IP address of the client computer against a database of IP addresses of known bot-infected computers. The web browser may transfer to the server computer the URL address of a normal home page as an HTML URL parameter. The server computer may redirect the web browser to the normal home page when the client computer is not infected by a bot or, when the client computer is bot-infected, to a solutions web page that provides access to a malicious code scanner that may be utilized to detect and remove the bot program.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Components may be implemented separately in multiple modules or together in a single module.

Figure 1:
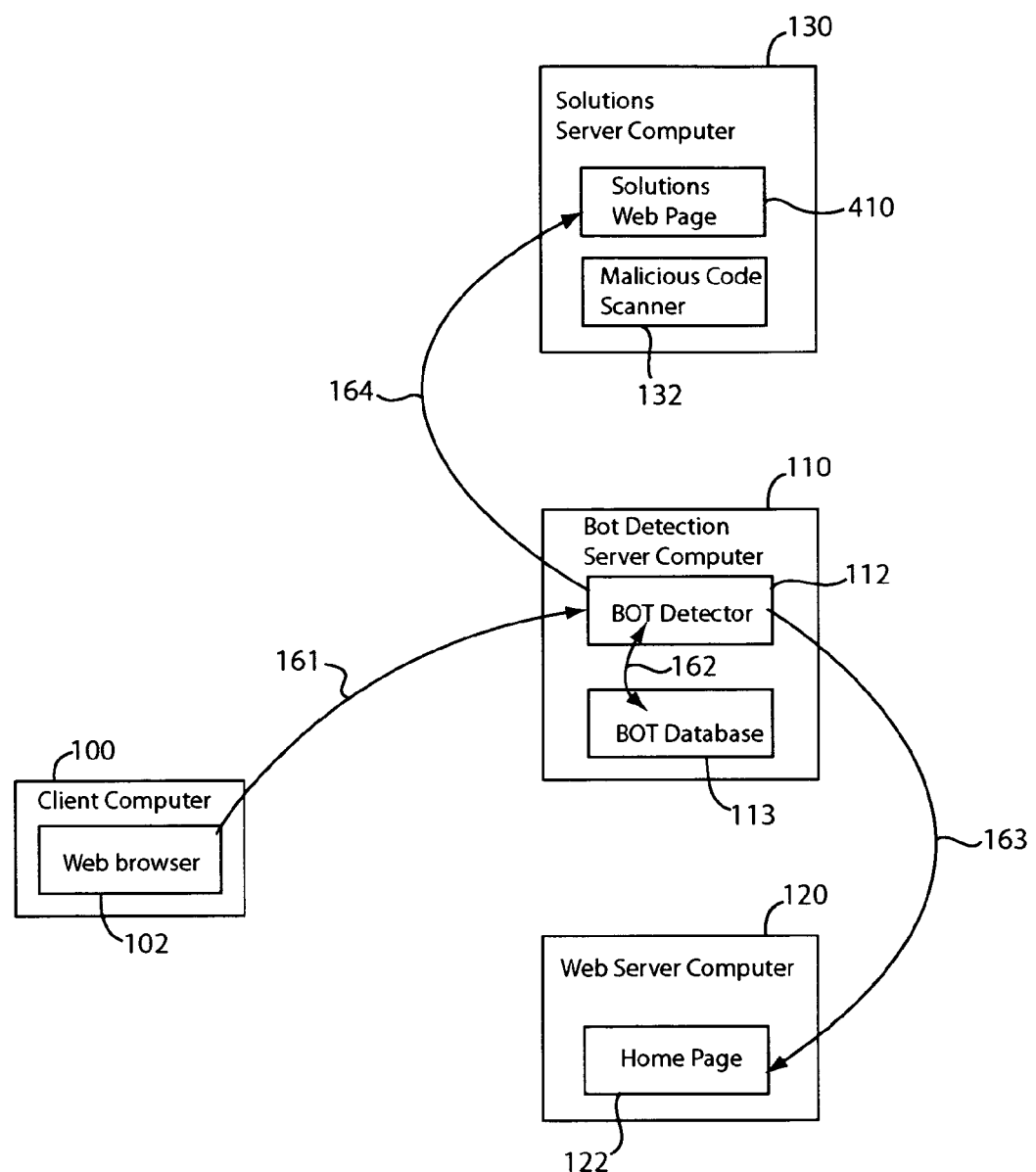
FIG. 1 shows a flow diagram illustrating detection of a bot-infected computer in accordance with an embodiment of the present invention.

FIG. 1 shows a flow diagram illustrating detection of a bot-infected computer in accordance with an embodiment of the present invention. As will be more apparent below, the detection of the bot infection may be performed every time the user invokes his web browser's home page. The detection of the bot infection may be performed automatically and without having to load and run a malicious code scanner in the user's computer. This advantageously makes it very convenient to use, thereby more likely to be accepted by users.

In the example of FIG. 1, the client computer 100, the bot detection server computer 110, the web server computer 120, and the solutions server computer 130 communicate over the Internet. Accordingly, arrows 161, 163, and 164 represent Internet connections.

The computer 100 may be any suitable user (i.e., consumer) computer including those running the Microsoft Windows™ operating system or the Apple Mac™ operating system. This is because the bot detection technique of the present invention advantageously does not require a particular operating system in the client computer 100. The web browser 102 may be the Microsoft Internet Explorer™ web browser, for example. Other web browsers may also be used because the technique advantageously does not rely on any unique web browser feature. For example, the technique may work equally well with the Firefox™, Netscape™, and Safari™ web browsers.

As is well known, a web browser's "home page" is the web page displayed by the web browser upon startup or when the home button of the web browser is activated. In one embodiment, the web browser 102 has been configured to contact the bot detection server computer 110 whenever the web browser's home page is invoked. That is, instead of having the user's desired home page (e.g., google.com) immediately contacted by the web browser 102 upon invocation of the home page, the web browser 102 is first pointed to the bot detection server computer 110 for bot-screening. Later described FIGS. 2 and 3 explain how to so configure the web browser 102 using the Microsoft Internet Explorer™ web browser as an example.

The bot detection server computer 110 includes a bot detector 112 and a bot database 113. The bot detector 112 may comprise computer-readable program code for determining whether or not a computer is infected by a bot. In one embodiment, the bot detector 112 is configured to receive a connection from the web browser 102 using HTTP (hypertext transfer protocol), for example. The bot detector 112 receives the IP (Internet Protocol) address of the client computer 100 and compares the IP address to those of known bot-infected computers listed in the bot database 113. If the IP address of the client computer 100 matches one of the IP addresses of known bot-infected computers listed in the bot database 113, the client computer 100 is deemed to be bot infected.

The bot database 113 comprises a listing of IP addresses of bot-infected computers. The IP addresses of bot-infected computers may be gathered from sender IP addresses of spam e-mails. For example, "honey pot" computers may be setup to attract and receive spam e-mails. The IP addresses of senders of the spam e-mails may be added to a bot database 113. Other ways of gathering IP addresses of bot-infected computers may also be used without detracting from the merits of the present invention. Popular network reputation services also compile a database of IP addresses of malicious computers; such databases may be used as the bot database 113. The bot database 113 may be implemented as a table, a list, a database or other means of storing and retrieving information.

The solutions server computer 130 comprises a server computer with a malicious code scanner 132. The malicious code scanner 132 may comprise computer-readable program code for detecting and removing malicious code, including bots. The malicious code scanner 132 may be utilized by the client computer 100 in the event the client computer is detected to be infected by a bot. The solutions server computer 130 may serve a solutions web page 410 configured to allow access to the malicious code scanner 132. The solutions server computer 130 may include Trend Micro, Inc.'s House-Call™ online virus scanner, for example. Also, to aid the user in ridding his computer of the bot or other infection, the solutions server may provide an assortment of downloadable antivirus or antispyware client programs for the user to install on his particular operating system, such as Trend Micro Inc.'s PC-Cillin™ software for the Windows™ operating system.

The web server computer 120 comprises a web server computer serving the user's desired home page 122. The home page 122 may be any suitable web page accessible over the Internet. For example, the home page 122 may be the main page of Yahoo!™ or Google™ web servers.

The flow diagram of FIG. 1 begins when the user on the client computer 100 invokes the home page of the web browser 102. This may occur upon initial startup of the web browser 102 or when the user activates the home button of the web browser 102. Because the web browser 102 is configured to first go to the bot detection server computer 110 upon invocation of the home page, the web browser 102 accordingly makes a connection to the bot detection server computer 110 (arrow 161).

It is to be noted that the home page of the web browser 102 is being used herein for purposes of illustration, not limitation. Other configurable URLs or ways of redirecting a web browser to a bot detection server computer may also be used. For example, the web browser 102 may also be configured to connect to the bot detection server computer 110 when the URL associated with its search button is invoked, or when the web browser 102 is pointed to a URL that is transformed or converted to the URL of the bot detection server computer 110 using a host file, for example. Still, the use of the home page is preferred because it is more frequently invoked, and thus allows for more opportunity to check the client computer 100 for bots.

Continuing the example of FIG. 1, the bot detector 112 in the bot detection server computer 110 gets the IP address of the client computer 100 from the HTTP connection from the web browser 102 and compares the IP address to those of known bot-infected computers listed in the bot database 113 (arrow 162). If the IP address of the client computer 100 is not in the database of IP addresses of bot-infected computers, the client computer 100 is assumed to be free of bots. In that case, the bot detector 112 redirects the web browser 102 to the home page 122 (arrow 163), which is the user's desired home page.

If the IP address of the client computer 100 is included in the list of IP addresses of bot-infected computers in the bot database 113, the bot detector 112 deems the client computer 100 to be bot-infected. In that case, in the example of FIG. 1, the bot detector 112 redirects the web browser 102 to the web page 410 of the solutions server computer 130 for disinfection (arrow 164). From the solutions server computer 130, the user may download the malicious code scanner 132 onto the client computer 100 to find and remove the bot. The malicious code scanner 132 may be configured to send a report to the bot detector 112 (or another module, service, or server for maintaining the bot database 113) after the bot has been found and removed from the client computer 100 so that the IP address of the client computer 100 may be removed from the bot database 113. Alternatively, the solutions server computer 130 may host a master bot database that may be updated and distributed to the bot detection server computer 110 and other such computers relying on a bot database to detect bots. The malicious code scanner 132 may update the master bot database by removing IP addresses of computers that have been disinfected of bots or by adding IP addresses of computers newly discovered as bot-infected.

Figure 2:
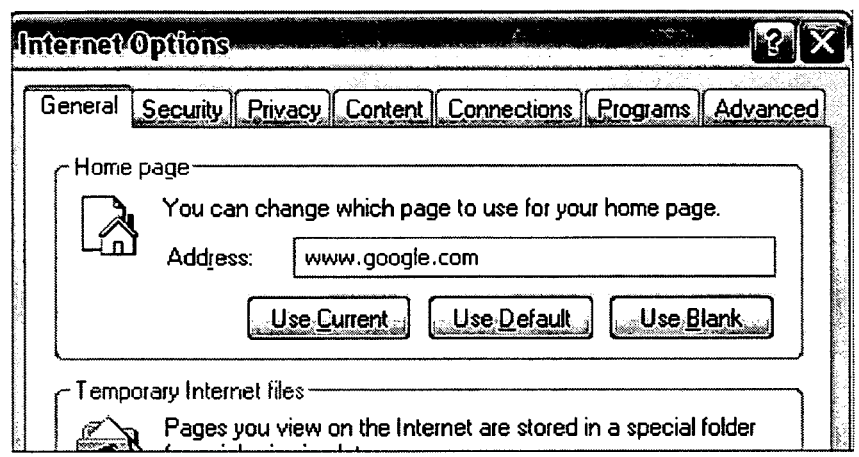
FIGS. 2 and 3 illustrate how to configure a web browser to first connect to a bot detection server computer prior to displaying a user's desired home page, in accordance with an embodiment of the present invention.
Figure 3:
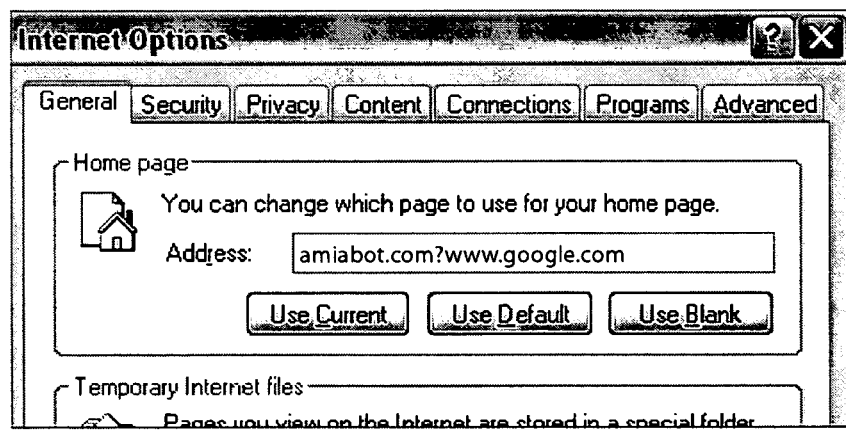

FIGS. 2 and 3 illustrate how to configure a web browser 102 to first connect to the bot detection server computer 110 prior to displaying the user's desired home page, in accordance with an embodiment of the present invention. FIGS. 2 and 3 show the "Internet Options" configuration menu of the Microsoft Internet Explorer™ web browser for illustration purposes only. In FIG. 2, the user's desired home page is that of the Google search engine. To connect to the bot detection server computer 110, the user merely has to change the home page address in the configuration menu to the address, i.e. uniform resource locator (URL) address, of the bot detection server computer 110, which in this example is "amiabot.com", followed by "?" and the name of the desired home page. This is shown in FIG. 3. The "?" in the configuration menu allows passing of parameters to the bot detection server computer 110. Accordingly, in the example of FIG. 3, the web browser 102 connects to the bot detection server computer 110 and passes the parameter "google.com" to the bot detection server computer 110 whenever the home page is invoked. This allows the bot detection server computer 110 to receive "google.com" as a parameter, and redirect the web browser 102 to "google.com" in the event the client computer 100 checks out to be free of bots (see FIG. 1, arrow 163).

As can be appreciated, other parameters may be passed to the bot detection server computer 110 every time the home page is invoked. For example, in addition to the desired home page address, an identifier (e.g., GUID) may also be passed by the web browser 102 to the bot detection server computer 110 to particularly identify the client computer 100. This allows the bot detection server computer 110 to record, identify, and monitor different computers that may be sharing the same IP address to connect to the Internet. Shown immediately below is an example where the identifier "19387232" is passed by the web browser 102 to the bot detection server computer 110:

amiabot.com?google.com&guid=19387232

The above configuration data may be entered into the home page address field in the Internet Options configuration menu of the Microsoft Internet Explorer™ web browser, for example.

The modification of a configuration menu to enter a home page address and other parameters may be performed manually or by a utility program. The utility program may ask the user for his desired home page or read the default home page setting from the browser configuration. The utility program may enter the user's desired home page and a calculated identifier in the web browser's configuration menu. The utility program may randomly generate the identifier.

In the case of a dial-up Internet connection, it is normally the case that the client computer is assigned a different IP address each time it connects to the dial-up Internet Service Provider (ISP). Even broadband ISPs typically change the IP address used by broadband modems from time to time. So the IP address of a bot infected computer may change over time; the bot from the infected computer may be detected and removed when the computer's IP address gets added to the bot database 113.

It is to be noted that even in the case where there are several computers using the same IP address, the cycle of identifying a possibly or actually bot-infected client computer, disinfecting the client computer, and removing the IP address of the client computer from the bot database would ultimately result in bot-infected computers sharing the same IP address being disinfected. This is because the bot database will be periodically updated with IP addresses of computers performing unauthorized or malicious activities and, as long as a bot-infected computer using the IP address continues with its malicious activities, disinfection of client computers with the same IP address will occur until all of the offending client computers have been disinfected and consequently no longer added to the bot database. The use of an identifier is useful in these cases because, after disinfecting a bot-infected computer, the bot database may be updated to include the identifier and the IP address of that computer. This allows the bot detector 112 to identify that computer as newly-cleaned and bot-free, and thus does not have to be redirected to the solutions server computer 130.

Figure 4:
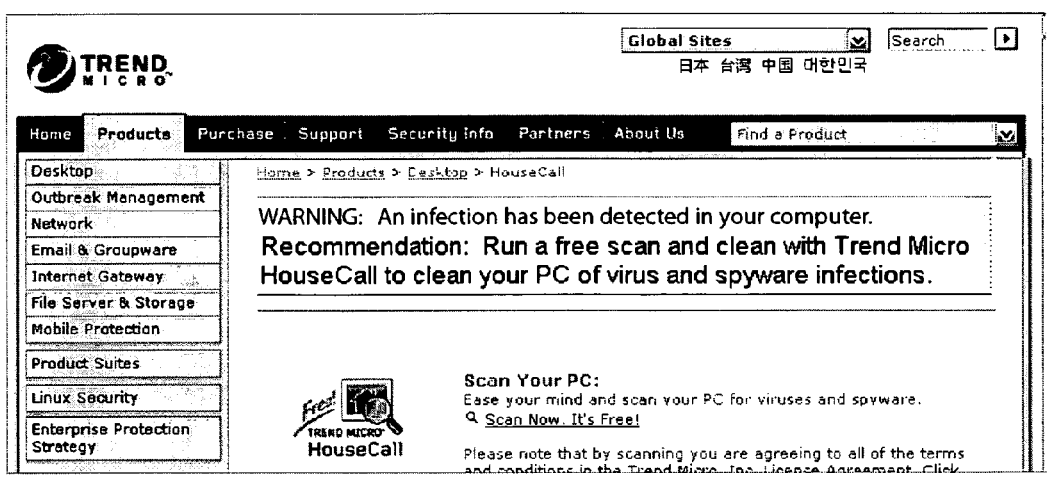
FIG. 4 shows an example web page for providing a malicious code scanner from a solutions server computer.

FIG. 4 shows an example web page 410 for providing the malicious code scanner 132 from the solutions server computer 130. The web page 410 may be served by the solutions server computer 130. The malicious code scanner 132 may be downloaded from the web page 410 or another web page linked to the web page 410. The web browser 102 may be redirected to display the web page 410 when the bot detector 112 deems that the client computer 100 is infected by a bot (see FIG. 1, arrow 164).

Figure 5:
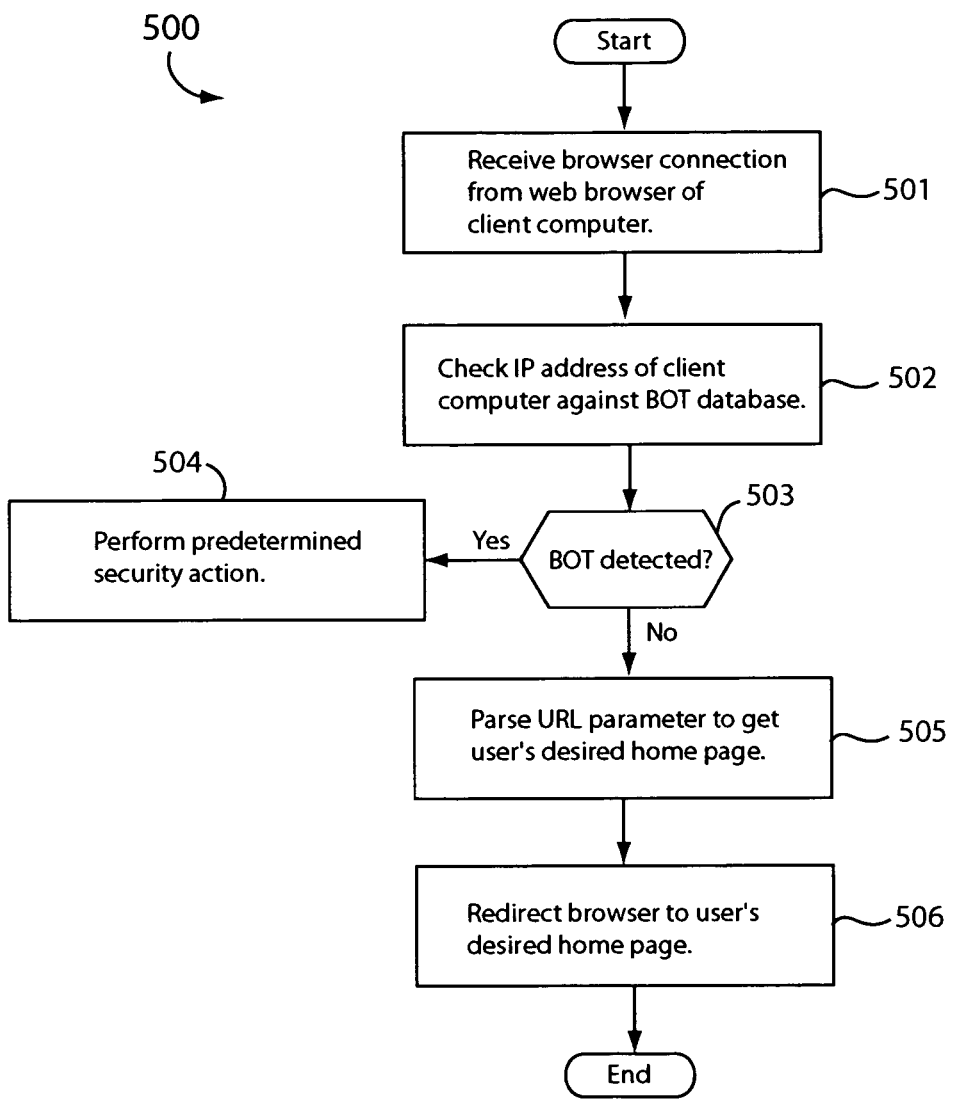
FIG. 5 shows a flow diagram of a method of checking a computer for bots using a web browser in accordance with an embodiment of the present invention.

FIG. 5 shows a flow diagram of a method 500 of checking a computer for bots using a web browser, in accordance with an embodiment of the present invention. The method 500 may be performed using the components shown in FIG. 1. Other components may also be used without detracting from the merits of the present invention.

The method 500 begins whenever a configurable URL of a web browser is invoked. The configurable URL may be the web browser's home page, a URL associated with a search button, or a URL generated by transformation or translation using a host file, for example. The configurable URL is preferably that of the web browser's home page because it is more frequently invoked. The home page of the web browser may be invoked by starting the web browser or activating its home page button, for example. The particulars of invoking a home page depends on the specific web browser employed. When the home page of the web browser is invoked, a bot detection server computer (e.g. FIG. 1, bot detection server computer 110) receives a web browser connection from the web browser (step 501). The web browser connection may be an HTTP connection. The home page address of the web browser may be configured to include the URL address of the bot detection server computer, with the URL address of the user's desired home page being passed as a URL parameter.

In the bot detection server computer, a bot detector (e.g. FIG. 1, bot detector 112) receives the IP address of the client computer running the web browser and checks the IP address against a bot database (e.g. FIG. 1, bot database 113) (step 502). The bot detector may receive the IP address of the client computer as part of the HTTP connection between the bot detection server computer and the client computer, for example. If the IP address of the client computer is included in the bot database as that of a possibly or known bot-infected computer, the bot detector deems the client computer as infected by a bot. In that case, the bot detector performs a predetermined security action (step 503 to step 504). The predetermined security action may involve redirecting the web browser to a solutions web page that allows for downloading of a malicious code scanner (e.g. FIG. 1, malicious code scanner 132) that may be used to disinfect the client computer.

As another example, the predetermined security action may involve alerting a network administrator. This is desirable in applications where several computers share the same IP address to connect to the Internet. By alerting the network administrator, such as by e-mail, the network administrator may initiate disinfection of computers in the network that share the same IP address to connect to the Internet. The network administrator may configure his network such that those who connect to the Internet are redirected to a solutions web page asking them to scan their computers for malicious code. The network administrator may also use logs of the network to identify computers likely to have been infected by bots. After finding and eliminating bots from computers in his network, the network administrator may have the IP address removed from the master bot database by reporting to the maintainer of the master bot database.

If the IP address of the client computer is not in the list of IP addresses of bot-infected computers included in the bot database, the bot detector may deem the client computer as free of bots (step 503 to step 505). In that case, the bot detector may parse the URL parameter passed by the web browser to get the URL address of the user's desired home page (step 505). The bot detector may then redirect the web page to the user's desired home page (step 506).

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of checking computers for bots using a web browser, the method to be performed by a first server computer and comprising:
   receiving in the first server computer a web browser connection from a web browser running in a user client computer, the web browser connection resulting from invocation by a user of the user client computer of a home page button of the web browser;
   receiving in the first server computer a uniform resource locator (URL) address of a web page as a URL parameter from the web browser, the web page being hosted in a second server computer separate from the first server computer, the URL address of the web page being included in a home page address field of an Internet option configuration menu of the web browser, the web browser being configured to contact the first server computer to check if the client computer is infected by a bot prior to contacting the second server computer hosting the web page;
   receiving an Internet Protocol (IP) address of the client computer;
   determining whether the client computer is infected by a bot by comparing the IP address of the client computer to IP addresses of bot-infected computers; and
   using the URL address of the web page that has been received as a URL parameter from the web browser, redirecting the web browser to the web page when the client computer is not infected by a bot.

2. The method of claim 1 further comprising:
   redirecting the web browser to a solutions web page when the client computer is infected by a bot, the solutions web page being configured to provide access to a malicious code scanner that may be downloaded to the client computer to remove the bot.

3. A server computer comprising:
   a bot database comprising a set of IP addresses of bot infected computers; and
   a bot detector configured to receive a web browser connection from a web browser that has been activated to go to the web browser's home page the activation of the web browser's home page resulting in the web browser including a URL of another server computer in the web browser connection, the bot detector being configured to check an IP address of a client computer running the web browser against the set of IP addresses of bot-infected computers in the bot database and to redirect the web browser to the other server computer to display a web page when the IP address of the client computer does not match any of the IP addresses of bot-infected computers in the bot database.

4. The server computer of claim 3 wherein the bot detector is configured to redirect the web browser to a solutions web page for downloading a malicious code scanner to the client computer when the IP address of the client computer matches an IP address of a bot-infected computer in the bot database.

5. The server computer of claim 3 wherein the bot detector checks the client computer for bots whenever the home page of the web browser is invoked.

6. The server computer of claim 3 wherein the bot detector checks the client computer for bots whenever the web browser is started up.

7. A method of checking computers for bots using a web browser, the method to be performed by a first server computer and comprising:
   receiving in the first server computer a web browser connection from a client computer prior to connecting the web browser to a second server computer, a URL address of the first server computer and a URL address of the second server computer being included in a home page address field of the web browser;
   based on information from the web browser connection, determining if the client computer is infected by a bot that has been configured to perform an activity using the client computer without authorization from the user of the client computer; and
   redirecting the web browser to the second server computer to display a first web page when the client computer is not infected by a bot.

8. The method of claim 7 further comprising:
   redirecting the web browser to display a solutions web page when the client computer is infected by a bot, the solutions web page being configured to provide access to a malicious code scanner that may be utilized by the client computer to remove the bot.

9. The method of claim 7 wherein the activity comprises sending spam e-mail from the client computer.

10. The method of claim 7 wherein the activity comprises using the client computer to participate in a denial of service attack.

11. The method of claim 7 wherein the server computer receives the web browser connection whenever the web browser is started up.

12. The method of claim 7 wherein the first server computer receives the web browser connection whenever a user of the client computer invokes a home page of the web browser.

* * * * *